J. W. Sanders,
Wood Fence,
N° 65,284. Patented May 28, 1867.
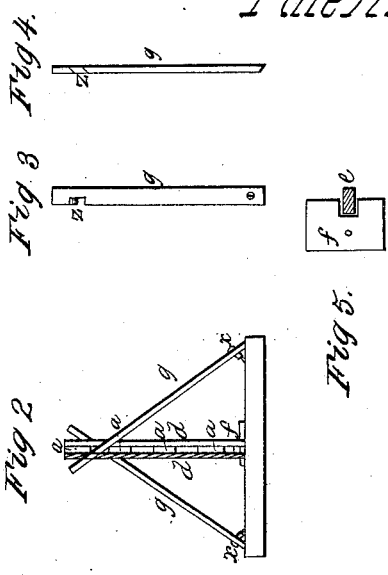
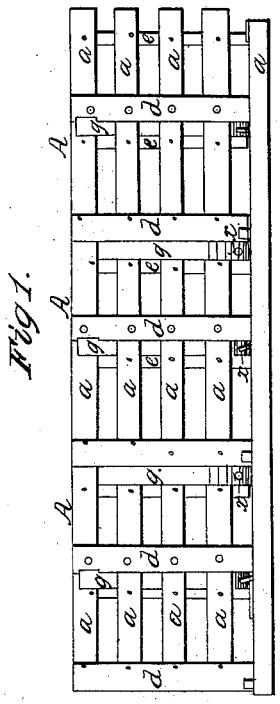
Witnesses:
Inventor:
J. W. Sanders

United States Patent Office.

J. W. SANDERS, OF RIPON, WISCONSIN.

Letters Patent No. 65,284, dated May 28, 1867.

FENCE.

The Schedule referred to in these Letters Patent and making part of the same.

TO ALL WHOM IT MAY CONCERN:

Be it known that I, J. W. SANDERS, of Ripon, in the county of Fond du Lac, and in the State of Wisconsin, have invented certain new and useful Improvements in Fences; and do hereby declare that the following is a full, clear, and exact description thereof, reference being had to the accompanying drawings, and to the letters of reference marked thereon, making a part of this specification.

In the annexed drawings, A A A represent three sections of the fence placed together and stationed upon the earth without the use of posts. Each of said sections is composed of a series of horizontal rails connected by two narrow boards, $e\ e$, on one side, and three broad strips, $d\ d$. One of these strips is placed opposite one of the boards, $e$, leaving a small space between the two for the insertion of the brace. The other two strips are placed at opposite sides at one end of the rails $a\ a$, forming a groove between the boards. Each section is thus formed, having a groove at one end, and the rails projecting at the other, so that when they are placed together, as seen in the drawings, the fence is continuous by the ends being inserted into the grooves. Each section is braced by two stays, $g\ g$, which are provided with a slanting notch, $z$, (see figs. 3 and 4,) and a small hole at the bottom. The stays are made to fit in the space between the broad and narrow uprights, and, when connected by means of the notch, cannot be withdrawn without raising up and turning around. They are connected to the ground by pins, $x$, passing through the openings at the bottom. $f$ represents blocks of wood, metal, stone, or other material, with a notch cut in the face for admitting the lower ends of the bars $e$, while under each groove there is a stud, (see dotted lines, fig. 1,) or small post, driven in the earth for assisting to keep the fence stationary.

Having thus fully described my invention, what I claim as new, and desire to secure by Letters Patent, is—

The portable sections A, as constructed, when used in combination with the stays $g\ g$, blocks $f$, and studs, in manner and for the purposes specified.

In testimony that I claim the foregoing I have hereunto set my hand and seal this 8th day of April, 1867.

J. W. SANDERS.

Witnesses:
S. G. DODGE,
W. W. KELLOGG.